Oct. 23, 1956     G. E. WAGNER     2,768,004
LOAD BINDER FOR VEHICLES

Filed Jan. 6, 1954     2 Sheets-Sheet 1

George E. Wagner
INVENTOR.

BY *[signatures]*
Attorneys

Oct. 23, 1956        G. E. WAGNER        2,768,004
LOAD BINDER FOR VEHICLES
Filed Jan. 6, 1954                    2 Sheets-Sheet 2
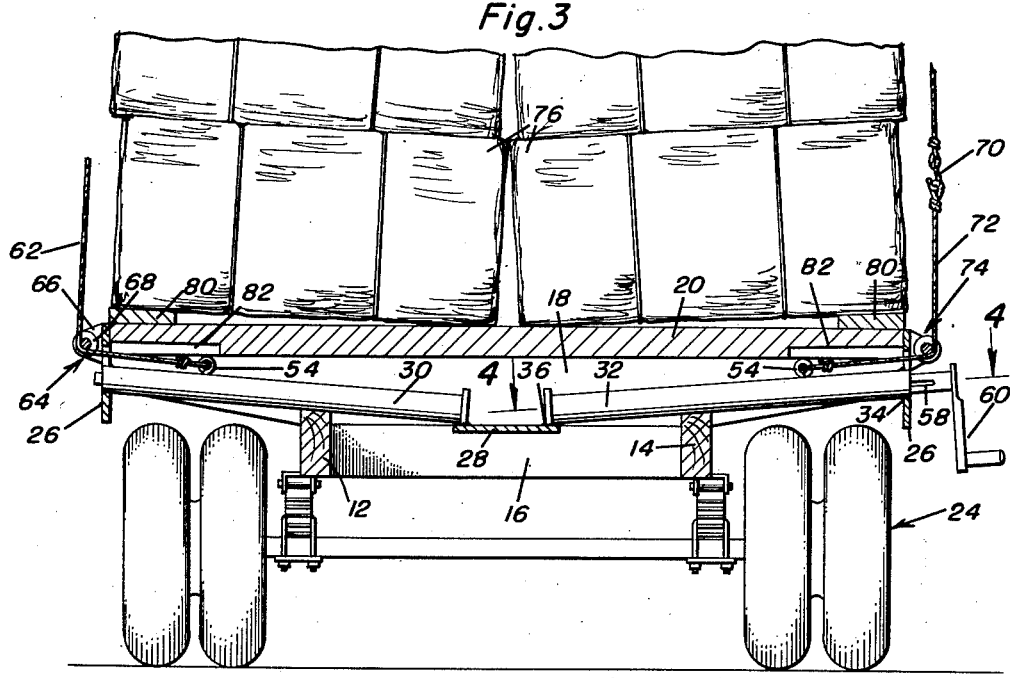
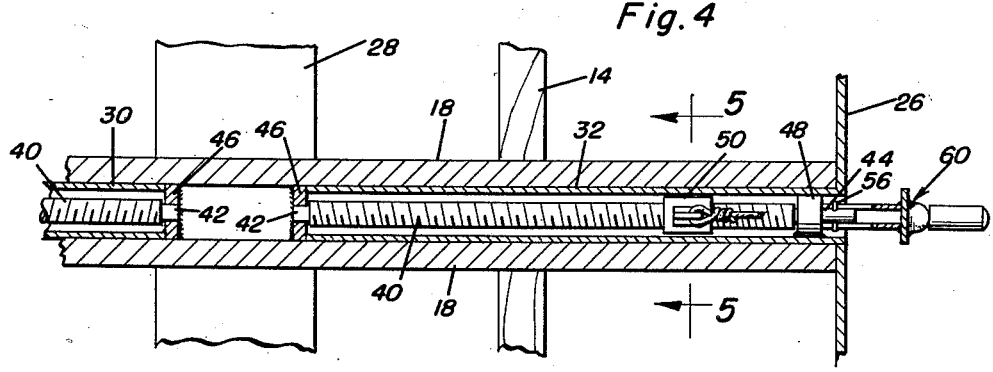
George E. Wagner
INVENTOR.

United States Patent Office 2,768,004
Patented Oct. 23, 1956

2,768,004

LOAD BINDER FOR VEHICLES

George E. Wagner, Hanging Rock, Ohio, assignor of one-half to Carl Moritz, Ironton, Ohio Application January 6, 1954, Serial No. 402,545

2 Claims. (Cl. 280—179)

This invention relates generally to improvements in vehicle attached load binders and pertains more particularly to a load binder construction adapted primarily for use in conjunction with bulky produce such as baled hay and the like.

A primary object of this invention is to provide an improved form of load binder for vehicles which comprises a pair of housing members each journalling a work shaft upon which a nut member is threadedly engaged for connection to the opposite ends of a flexible element adapted to pass over and bind the load on the vehicle bed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical section taken substantially along the plane of section line 3—3 of Figure 1;

Figure 4 is an enlarged horizontal section taken substantially along the plane of section line 4—4 in Figure 3; and Figure 5 is an enlarged vertical section taken substantially along the plane of section line 5—5 in Figure 4.

Figure 1:
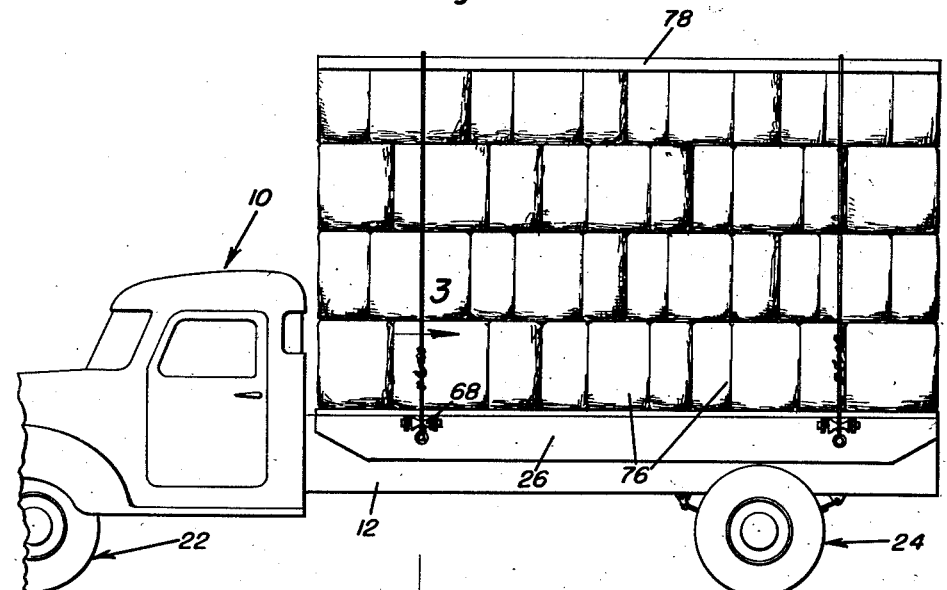
Figure 1 is a side elevational view of a loaded truck showing the binder in use.

Referring now more particularly to the drawings, a vehicle upon which the binder construction is to be utilized is indicated generally by the reference character 10 and it is to be appreciated that this truck body incorporates longitudinal side frame members 12 and 14, transverse frame members 16, transverse bed supporting members 18 and a bed 20 of suitable construction. The vehicle is provided with conventional front and rear wheel assemblies 22 and 24 respectively.

On opposite sides of the bed 20 and depending therefrom are vertical plate members 26 which form a portion of the binder construction. Disposed centrally of the vehicle body and underlying the bed 20 thereof is a longitudinally extending support plate 28 to which the inner ends of the housing members 30 and 32 are attached. These housing members are arranged in pairs and as many pairs as are desired or needed are provided on the vehicle body. The outer end of the housing member in each pair projects through the vertical plate member 26 at corresponding sides of the vehicle body and are secured as by welding 34, the inner end of the housing being also secured by welding 36 to the support plate 28.

The housings are of tubular configuration and are provided with longitudinally extending elongated slots 38 disposed on their upper surfaces, these slots extending a substantial extent of the length of the housing. A worm shaft 40 is journalled within each of the housings, the worm shaft having reduced end portions 42 and 44 rotatably received in the inner end cover members 46 and pushing members 48 respectively, these members being rigidly secured to the housing. In this manner, the worm shafts are rotatably received in the housing but are longitudinally affixed relative thereto.

A nut member 50 is associated with each of the worm shafts and each nut member is provided with a radial projection 52 extending through a corresponding slot 38 in the housing to prevent rotation of the nut member as the worm shafts are turned. Eyes 54 on other suitable fastening members are secured to the radial projection 52. The outer reduced ends 44 of the worm shaft project outwardly of the housing and are provided with transverse pin members 56 adapted to be received in notches 58 in a crank member 60.

The cable, rope or the like 62 has one of its ends secured to one of the eyes 54 and extend therefrom outwardly of the truck body through a suitable aperture in the corresponding side plate 26 and over a roller assembly indicated generally by the reference character 64 which comprises a pair of bracket ears 66 secured to the side plate and a roller member 68 journalled therebetween, the opposite end of the flexible member or cable being provided with a hook 70 in the manner shown most clearly in Figure 3. The other eye 54 is provided with a short length of cable or rope 72 which extends over a roller assembly 74 for connection to the hook 70 in the manner shown.

Thus, when both the products such as the bales of hay 76 illustrated have been loaded on the truck bed, the rope 62 is thrown over the load and the flexible elements 72 connected thereto and the crank 60 is used to run the nut member 50 down on the worm shaft to securely bind the load on the truck bed.

Figure 2:
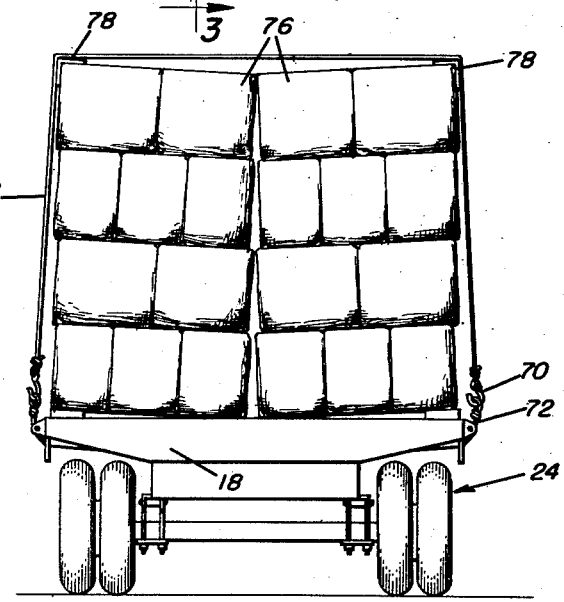
Figure 2 is a rear elevational view of the assembly shown in Figure 1.

As previously stated, any suitable number of binder assemblies may be provided on the vehicle body, it being usually preferred that at least two are utilized. To evenly distribute the binding action to the bales, angle members 78 may be positioned on the uppermost tier of the bales in the manner shown most clearly in Figures 1 and 2. Also, to properly position the load the truck bed 20 may be provided with abutment strips 80 on its opposite side edges, see particularly Figure 3.

It may be preferred to utilize short links of flexible cables such as that indicated by the reference character 72 on all of the eye elements 54 since rubbing of these cable members against the rollers 64 and 74 might otherwise tend to too rapidly wear other flexible elements such as may be used. It will also be noted that it may be necessary to notch the undersurface of the bed 20 at opposite sides thereof as indicated by the reference characters 82 to provide proper clearance for the flexible cable and the eye members 54.

By the construction above described it will be manifest that it will be a relatively simple job to properly bind a load on an associated truck bed and that the binding action will be extremely effective to maintain the load in proper position while the truck is being driven to its destination.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a vehicle body having a flat bed, a load binder including a vertical plate member depending from opposite sides of said body, a support plate disposed longitudinally beneath said bed, a pair of elongated tubular housings transversely disposed beneath said bed in an outwardly and upwardly extending direction having their inner ends secured to said support plate and their outer ends secured to corresponding vertical plates, a worm shaft rotatably journalled within each of said housings, said housings each having an elongated upper longitudinal slot, a nut member threadedly engaged on each of said worm shafts and having a radial projection extending through a corresponding slot, pulley members secured adjacent to the top of said vertical plate members, and a flexible member having its opposite ends connected to the radial projections of said nut members and extending over said pulley members and the load to apply a binding force against the load upon rotation of said worm shafts in the housings causing the nut members to move in an inward direction in said housings.

2. In the combination as set forth in claim 1 wherein said worm shafts include a portion extending beyond the vertical plate members for operable engagement by a manually adjustable handle.

References Cited in the file of this patent

UNITED STATES PATENTS

| | | |
|---|---|---|
| 405,819 | Billings | June 25, 1889 |
| 546,518 | Fountain | Sept. 17, 1895 |
| 780,837 | Sydenstricker | Jan. 24, 1905 |
| 1,003,108 | Hinrichs | Sept. 12, 1911 |
| 1,120,798 | Duecker | Dec. 15, 1914 |
| 1,867,352 | Churgay et al. | July 12, 1932 |
| 2,144,410 | Ludington | Jan. 17, 1939 |